Nov. 4, 1924.
S. COLSON
BOLL WEEVIL DESTROYER
Filed March 17, 1922
1,514,372
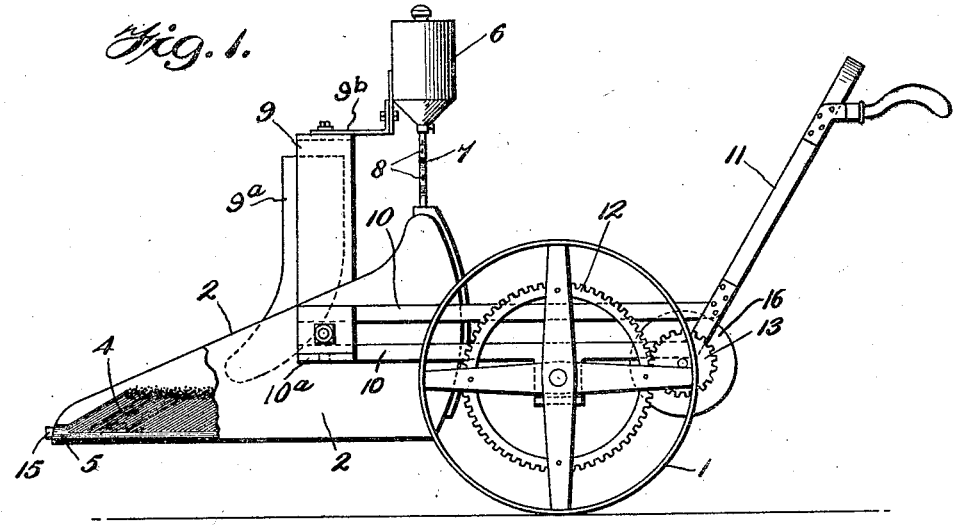
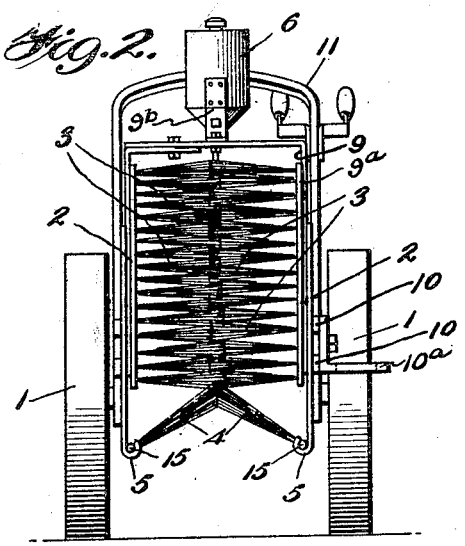
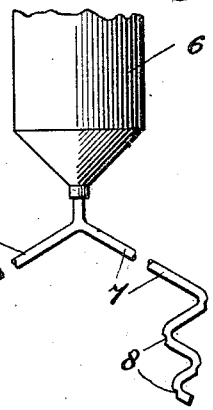
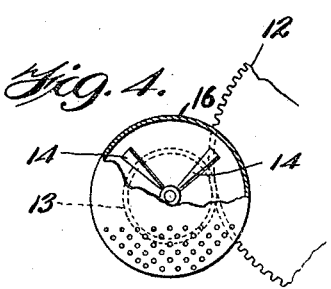
Inventor
S. Colson, by
Byron B. Colling
Attorney Patented Nov. 4, 1924.

1,514,372

UNITED STATES PATENT OFFICE.

SAM COLSON, OF ELBERTON, GEORGIA.

BOLL-WEEVIL DESTROYER.

Application filed March 17, 1922. Serial No. 544,587.

*To all whom it may concern:*

Be it known that I, SAM COLSON, a citizen of the United States, residing at Elberton, in the county of Elbert and State of Georgia, have invented certain new and useful Improvements in Boll-Weevil Destroyers, of which the following is a specification.

My invention relates to boll weevil destroyers wherein the destroyer is passed over the plants infested with boll weevils, and brushes inside the apparatus brush the boll weevils or other insects from off the cotton plant and into an insecticide or some fluid of some kind to kill the insects.

The object of my invention is to sweep off from the plant, leaves, stems, etc., all the insects that may have collected on the plant and kill them.

Another object of my invention is to arrange the brushes so that they will not injure the plant as they pass over it, but will be sufficiently stiff to sweep off the insects without bruising the plant.

Another object of the invention is to collect the insects into a gutter or trough kept supplied with an insecticide to kill the insects as they fall therein.

Another object of the invention is to keep the brushes continuously supplied with the insecticide and a sufficient quantity in the gutters to kill the insects.

Another object of the invention is to provide an apparatus that may be attached to an ordinary plow stock or to a wheeled vehicle and when attached to the latter, I may employ a poison distributor operated from the wheels of the vehicle.

Further the invention consists in various constructions and combinations, all as hereinafter described and particularly pointed out in the claims.

In the accompanying drawings forming part of this specification:

Figure 1 is a side view partly broken away, of the apparatus when mounted on wheels;

Figure 2 is an end view of the same;

Figure 3 is a view of the insecticide holder;

Figure 4 is a view partly in section of the dust or poison distributor.

This insecticide destroyer is mounted on a pair of wheels 1 which support side frame bars 10 and to the forward end of these frame bars is attached the destroyer proper which includes an enclosing structure embodying a pair of side plates 2 substantially triangular in form and having at their lower edges gutters 5 supporting brushes 4 which are slightly inclined backwardly as shown in Figure 1 and upwardly as shown in Figure 2. To the inner sides of the plates 2 are secured the lower ends of the inverted U-shaped yoke 9, carrying on its inside brush back members 9ª. At the forward end of one pair of frame bars 10 is fixed an angle iron step 10ª. The brush backs 9ª support over lapping brushes 3. On top of the yoke is a standard 9ᵇ supporting an insecticide can 6 having spouts 7 with holes 8 therein to permit the insecticide to run therefrom on to the brushes and thence into the gutters or troughs, or the troughs may be fed independently, a handle 11 is also supplied as shown.

I find it advantageous after the brushes have passed over the plants to dust them with poison powder and to effect this in a convenient way, I attach a cogged wheel 12 to the vehicle wheel and have it intermesh with a wheel 13 on the side of the powder container. The powder container may have paddles 14 for stirring the powder and pushing it through the holes in the powder container.

It is evident that the brush container with the can of insecticide may be taken off the vehicle and attached at one side to an ordinary plow stock so that as the plants are being plowed, they may also be swept of the insects and the latter destroyed.

The operation of the device is apparent from the foregoing description, but to recapitulate, the apparatus is drawn over the row of plants and the brushes sweep off the insects from the leaves, squares, bolls, etc., and as they are swept off they come in contact with the insecticide and are killed and fall into the gutters 5 from which they may be removed by removing the stopper 15 and brushing or pulling them out of the gutter, the stopper 15 when inserted preventing the insecticide from running out too fast. After the exterior of the plants have been cleared of the boll weevil as far as possible it will ordinarily be found that some of the insects are inside of the cotton boll and it has been found best to sprinkle the boll weevil poison on the leaves and bolls of the plant. For this purpose the poison is placed within the powder receptacle 16 and as the wheel 1 turns it carries with it the cog wheel 12 which turns the receptacle 16 through the pinion 13, thus causing the powder in the receptacle to be sprinkled on the plant.

I claim as my invention:

1. An insect destroyer comprising a casing, brushes projecting inwardly from both sides of the casing and overlapping, a support for the casing, and means to supply insecticide to the brushes, as described.

2. An insect destroyer comprising a casing, brushes extending from both sides of the casing inwardly and overlapping, gutters in the lower part of the casing, and inclined brushes extending from said gutters, substantially as described.

3. An insect destroyer comprising a casing, gutters or troughs along the sides of the casing, a row of brushes extending from the troughs upwardly and backwardly whereby insects falling on the brushes will slide into the troughs or gutters, substantially as described.

4. An insect destroyer comprising wheels, a frame, a casing carried by the frame on the wheels, brushes extending from both sides of the casing inwardly and overlapping at their ends, gutters in the lower part of the casing, brushes extending from the gutters upwardly and backwardly and meeting near the middle of the casing, and means for supplying insecticide to the brushes.

5. An insect destroyer comprising a vehicle, a frame thereon carrying a brush casing, brushes in the casing extending from either side and overlapping at their ends, gutters in the lower part of the casing, brushes extending from the sides of the gutters upwardly and meeting near the middle of the casing to brush the insects from the plant, and a dust distributor carried by the vehicle for sprinkling poison on the plants after the insects have been removed therefrom, substantially as described.

In testimony whereof I hereunto affix my signature.

SAM COLSON.